US008446574B2

(12) United States Patent
Ueno

(10) Patent No.: US 8,446,574 B2
(45) Date of Patent: *May 21, 2013

(54) VELOCITY MEASURING DEVICE AND METHOD

(75) Inventor: Tatsuya Ueno, Tokyo (JP)

(73) Assignee: Azbil Corporation, Tokyo (JP)

( * ) Notice: Subject to any disclaimer, the term of this patent is extended or adjusted under 35 U.S.C. 154(b) by 281 days.

This patent is subject to a terminal disclaimer.

(21) Appl. No.: 12/956,645

(22) Filed: Nov. 30, 2010

(65) Prior Publication Data

US 2011/0164243 A1    Jul. 7, 2011

(30) Foreign Application Priority Data

Jan. 5, 2010    (JP) .................. 2010-000533

(51) Int. Cl.
*G01P 3/36*    (2006.01)
*G01B 9/02*    (2006.01)

(52) U.S. Cl.
USPC ............................................ 356/27; 356/450

(58) Field of Classification Search
USPC ................... 356/429–431, 496–502, 27–28.5
See application file for complete search history.

(56) References Cited

U.S. PATENT DOCUMENTS

| 4,066,999 | A | 1/1978 | Spanjersberg et al. |
| 7,684,957 | B2 | 3/2010 | Ueno |
| 7,911,593 | B2 | 3/2011 | Ueno |
| 7,961,302 | B2 | 6/2011 | Ueno |
| 2009/0195771 | A1* | 8/2009 | Ueno ........................... 356/28.5 |
| 2009/0257067 | A1* | 10/2009 | Chapman et al. ............. 356/498 |
| 2010/0332171 | A1 | 12/2010 | Ueno |

FOREIGN PATENT DOCUMENTS

| EP | 1978377 A2 | 10/2008 |
| EP | 2085789 A2 | 8/2009 |
| JP | 2004-513348 A | 4/2004 |
| JP | 2006-313080 A | 11/2006 |
| JP | 2009-47676 A | 3/2009 |

OTHER PUBLICATIONS

European Patent Application No. 11150186.2: Extended European Search Report, dated Nov. 4, 2011.

* cited by examiner

*Primary Examiner* — Tara S Pajoohi Gomez
(74) *Attorney, Agent, or Firm* — Troutman Sanders LLP

(57) ABSTRACT

The velocity calculating device includes a semiconductor laser for emitting a laser beam at a web that is the subject to be measured; a photodiode for converting into an electric signal the optical power of the semiconductor laser; a lens for focusing and emitting the beam from the semiconductor laser and for focusing the return light from the web and injecting it into the semiconductor laser; a laser driver for driving the semiconductor laser; a current-voltage converting/amplifying portion for converting the output current from the photodiode into a voltage and then amplifying; a filter portion for removing the carrier wave from the output voltage of the current-voltage converting/amplifying portion; a signal extracting portion for counting the number of interference waveforms included in the output voltage of the filter portion; and a calculating portion for calculating the velocity of the web based on the counting result of the signal extracting portion.

6 Claims, 12 Drawing Sheets

VELOCITY MEASURING DEVICE AND METHOD

CROSS REFERENCE TO RELATED APPLICATIONS

The present application claims priority under 35 U.S.C. §119 to Japanese Patent Application No. 2010-000533, filed Jan. 5, 2010, which is incorporated herein by reference.

FIELD OF TECHNOLOGY

The present invention relates to a velocity measuring device and method for measuring the velocity of the web that is a physical object that is in conveyance by a conveying device from a sending side to a receiving side.

BACKGROUND OF THE INVENTION

In a web conveyor device that feeds out, from a sending portion a physical object wherein the paper, film, cellophane, metal foil, rubber, or the like, is rolled into the shape of a roll (hereinafter termed a "web"), to perform a specific process on the web, and then to take up the web, in a receiving portion, after processing, it is necessary to control the velocity of movement of the web so as to be uniform, and to measure accurately the length of web that is fed out and taken up.

Conventionally there has been the method disclosed in Japanese Patent 4180369 ("JP '369") as a method for measuring the velocity of a web. FIG. 21 is a block diagram illustrating the structure of the conventional velocity measuring device disclosed in JP '369. In this velocity measuring device, a laser beam that is emitted from a laser diode unit passes through a lens 201 to be focused, as a measuring beam 202, on a web 205, such as, for example, a paper sheet. If there is the web 205 in the path of the measuring beam 202, then the measuring beam 202 will reflect from the web 205 and will thus be scattered. One part of the emission of the measuring beam 202 that is scattered will trace the original path to be focused by the lens 201 onto the emission surface of the laser diode unit 200, to enter again into the laser resonator. The result is a change in the intensity of the laser emission. This change in intensity of the laser emission is detected by a photodiode within the laser diode unit 200, which performs conversion into an electric signal, and by an electronic circuit 203 that processes the electric signal.

The electronic circuit 203 forms a portion of a controller 204. The controller 204 controls the rotation of a roll 206, and thus controls also the movement of the web 205. When the web 205 moves, the return beam that is reflected from the web 205 experiences a Doppler shift. This means that the frequency of the return beam changes, or that a frequency shift occurs. This frequency shift is controlled by the velocity of movement of the web 205. The return beam that reenters the laser optical resonator interferes with the laser beam that is produced by the optical resonator. This interference means that a self-coupled effect occurs within the optical resonator. The intensity of the laser emission increases or decreases due to this interference.

Here, when an electric current that is driven in a repeating triangle wave that increases or decreases with a constant rate of change in respect to time is provided to the laser of the laser diode unit 200 as an driving current, the laser is driven so as to repetitively alternate between a first oscillating interval wherein the oscillating wavelength increases continuously at a constant rate of change and a second oscillating interval wherein the oscillating wavelength decreases continuously at a constant rate of change. The difference between the number of pulses that are included in the electric signal that is outputted from the photodiode during the first oscillating interval and the number of pulses included in the electric signal that is outputted from the photodiode in the second oscillating interval is proportional to the velocity of the web 205. Consequently, the electronic circuit 203 is able to calculate the velocity of the web 205 from the difference in the number of pulses.

However, in JP '369, the optical path length between the laser and the web 205 is relatively short, and the laser oscillating wavelength modulation frequency and amplitude are relatively small, so under a specific set of circumstances, such as the movement of the web 205 to be measured being relatively fast, the velocity of the web 205 will cease to be proportional to the difference in the aforementioned number of pulses. In this case, an average value is calculated for the number of pulses included in the electric signal that is outputted from the photodiode during the first oscillating intervals and the number of pulses included in the electric signal that is outputted during the second oscillating intervals, and a uniform constant is extracted from the average values, to confirm the velocity of the web 205.

As described above, in the conventional velocity measuring device disclosed in JP '369, it is assumed that the velocity of the web and the distance between the laser and the web are known roughly, and different methods for calculating the velocity are used depending on the state of the web. However, in the conventional velocity measuring device, disclosed in JP '369, if the velocity of the web and the distance to the web are not known, then it is not possible to use different methods for calculating the velocity depending on the state of the web, and thus there is a problem point in that it is not possible to calculate the velocity of the web correctly.

The present invention is to solve the problem set forth above, and the object thereof is to provide a velocity measuring device and method able to measure accurately the velocity of a web, through being able to handle the case wherein the velocity of the web and the distance between the laser and the web are unknown in a self-coupled velocity measuring device.

SUMMARY OF THE INVENTION

The velocity measuring device according to the present invention includes a semiconductor laser for emitting a laser beam at a web that is a physical object that is under conveyance by a conveying device from a sending side to a receiving side; oscillating wavelength modulating means for causing the semiconductor laser to operate so as to alternatingly be in a first oscillating interval wherein the oscillating wavelength continuously increases monotonically and a second oscillating interval wherein the oscillating wavelength continuously decreases monotonically; detecting means for detecting an electric signal that includes an interference waveform that is produced through a self-coupled effect between a laser beam that is emitted from the semiconductor laser and a return beam from the web; signal extracting means for counting the number of interference waveforms included in the output signal of the detecting means during the first emitting interval and the second emitting interval; sign applying means for applying a positive or negative sign to the most recent counting result by the signal extracting means; distance-proportional count calculating means for calculating a distance-proportional count, which is a number of interference waveforms that is proportional to an average distance between the semiconductor laser and the web, through calculating the average value of the number of interference waveforms, using a signed counting result wherein signs have been applied by the sign applying means; and velocity calculating means for calculating the velocity of the web from the distance-proportional count calculated by the distance-proportional count calculating means; wherein: the sign applying means apply a positive or negative sign to the most recent counting result of the signal extracting means depending on a magnitude relationship with twice the distance-proportional count calculated using the most recent counting result and a counting result prior to that counting result by the signal extracting means, depending on whether or not the directions of increase or decrease of the counting results of the signal extracting means match or do not match, or depending upon the change in the average values of the counting results.

In an example of the velocity measuring device, the signal extracting means are interference waveform counting means for counting the number of interference waveforms included in the output signal of the detecting means respectively for the first emitting interval and the second emitting interval; interference waveform period measuring means for measuring, each time an interference waveform of is inputted, the periods of the interference waveforms during the interval over which the interference waveform counting means count the number of interference waveforms; interference waveform period frequency distribution generating means for generating a frequency distribution of the periods of the interference waveforms during the counting interval, from the result of the measurement by the interference waveform period measuring means; representative value calculating means for calculating, as a representative value for the distribution of the periods of the interference waveforms, a bin value wherein the bin value multiplied by the frequency is maximum, from the frequency distribution of the periods of the interference waveforms; and corrected value calculating means for outputting a counting result after a correction, by correcting the counting result by the interference waveform counting means based on counts Ns and Nwn, calculating from the frequency distribution of the periods of the interference waveform a total Ns of the counts of the bins that are less than 0.5 times the representative value and a total Nwn of the counts of the bins that are no less than (n+0.5) times the representative value and less than (n+1.5) times the representative value (where n is a natural number that is not less than 1). Additionally, in a first structural example of a velocity measuring device according to the present invention, when the counting result by the interference waveform counting means is defined as Na, the representative value is defined as T0 and the maximum value that can be assumed by a period in the interference waveform is defined as Tmax, then the counting result Na' after correction is given by the following:

[Equations 1]

$$Na' = Na - Ns + \sum_{n=1}^{n_{max}} (n \times Nw_n)$$

$$n_{max} \leq \frac{T_{max}}{T0}$$

Additionally, the velocity measuring method according to the example includes an oscillating step for causing the semiconductor laser, which emits a laser beam at a web that is a physical object that is in conveyance by a conveying device from a sending side to a receiving side, to operate so as to alternatingly be in a first oscillating interval wherein the oscillating wavelength continuously increases monotonically and a second oscillating interval wherein the oscillating wavelength continuously decreases monotonically; a detecting step for detecting an electric signal that includes an interference waveform that is produced through a self-coupled effect between a laser beam that is emitted from the semiconductor laser and a return beam from the web; a signal extracting step for counting the number of interference waveforms included in the output signal received in the detecting step during the first emitting interval and the second emitting interval; a sign applying step for applying a positive or negative sign to the most recent counting result by the signal extracting step; a distance-proportional count calculating step for calculating a distance-proportional count, which is a number of interference waveforms that is proportional to an average distance between the semiconductor laser and the web, through calculating the average value of the number of interference waveforms, using a signed counting result wherein signs have been applied by the sign applying step; and a velocity calculating step for calculating the velocity of the web from the distance-proportional count calculated by the distance-proportional count calculating step; wherein: the sign applying step applies a positive or negative sign to the most recent counting result of the signal extracting step depending on a magnitude relationship with twice the distance-proportional count calculated using the most recent counting result and a counting result prior to that counting result by the signal extracting step, depending on whether or not the directions of increase or decrease of the counting results of the signal extracting step match or do not match, or depending upon the change in the average values of the counting results.

Given the present example, it is possible to provide sign applying means for applying a positive or negative sign to the most recent counting result of the signal extracting means depending on a magnitude relationship with twice the distance-proportional count calculated using the most recent counting result of the signal extracting means and a counting result prior to that counting result, whether or not the directions of increase or decrease of the counting results of the signal extracting means match, or depending on a change in the average values of the counting results, to evaluate whether the web is in a state of normal displacement or in a state of microdisplacement, and if the web is in a state of normal displacement, it is possible to perform a correction that applies a negative sign to a counting result that has doubled back to the positive side, making it possible to correctly calculate the distance-proportional count, and, as a result, making it possible to calculate the velocity of the web correctly. Consequently, the present invention makes it possible to handle even cases wherein the web velocity and the distance between the semiconductor laser and the web are unknown.

Additionally, the periods of the interference waveforms are measured during the counting interval and a frequency distribution of the periods of the interference waveforms during the counting interval is generated from the measurement results, where the bin value wherein the bin value multiplied by the frequency is a maximum is defined as a representative value for the period of the interference waveform, and a total Ns of the counts of the bins that are less than 0.5 times the representative value and totals Nwn for the counts of the bins that are no less than (n+0.5) and less than (n+1.5) of the representative value are calculated, where the counting results by the interference waveform counting means are corrected based on these frequencies Ns and Nwn to enable correction, with high accuracy, of counting error in the interference waveforms, even when noise is continuously produced at a frequency that is higher than that of the interference waveform in the signal that is inputted into the signal extracting means, thus making it possible to improve the measurement accuracy of the velocity of the web.

DETAILED DESCRIPTION OF THE INVENTION

Figure 1:
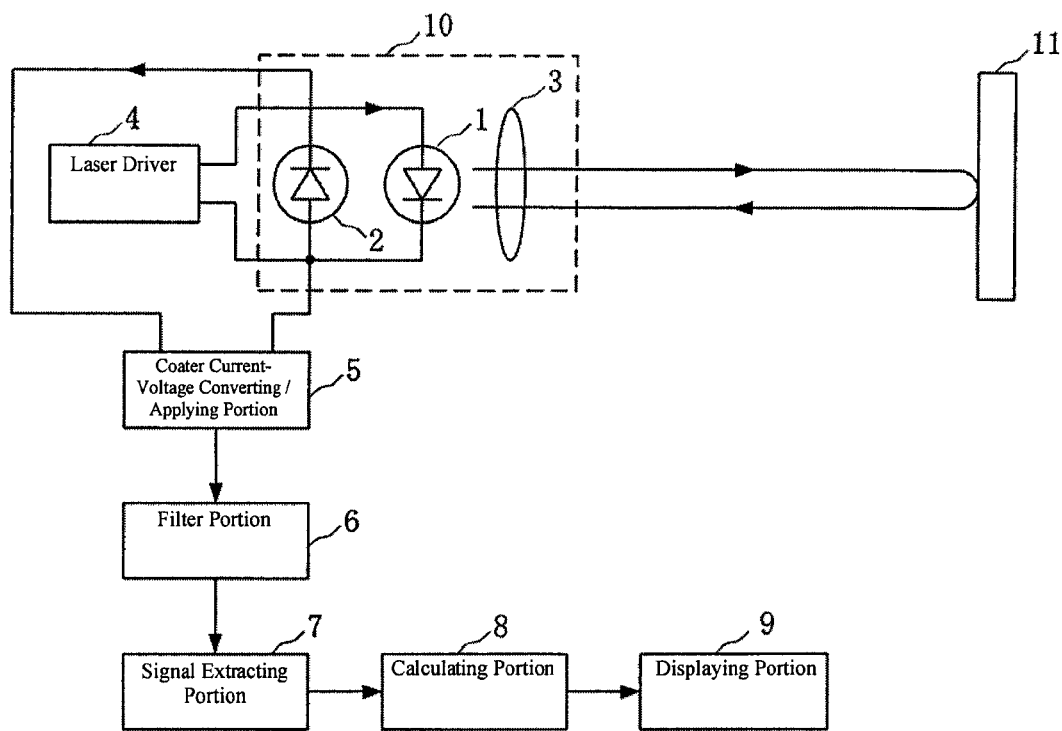
FIG. 1 is a block diagram illustrating the structure of a velocity measuring device according to an example.

Example according to the present invention is explained below in reference to the drawings. FIG. 1 is a block diagram illustrating a structure for a velocity measuring device according to an example. The velocity measuring device in FIG. 1 includes a semiconductor laser 1 for emitting a laser beam at a web 11 that is the subject of the measurement; a photodiode 2 for converting the optical power of the semiconductor laser 1 into an electric signal; a lens 3 for focusing and emitting light from the semiconductor laser 1, and for focusing and injecting into the semiconductor laser 1 the return light from the web 11; a laser driver 4 that serves as oscillating wavelength modulating means for driving the semiconductor laser 1; a current-voltage converting/amplifying portion 5 for converting the output current from the photodiode 2 into a voltage and for amplifying that voltage; a filter portion 6 for eliminating the carrier wave from the output voltage of the current-voltage converting/amplifying portion 5; a signal extracting portion 7 for counting the number of mode hop pulses (hereinafter termed MHPs) that are the self-coupled signals that are included in the output voltage of the filter portion 6; a calculating portion 8 for calculating the velocity of the web 11 based on the counting results of the signal extracting portion 7; and a displaying portion 9 for displaying the measurement result of the calculating portion 8.

The semiconductor laser 1, the photodiode 2, and the lens 3 structure a sensor module 10. Additionally, the photodiode 2 and the current-voltage converting/amplifying portion 5 structure detecting means.

Figure 2:
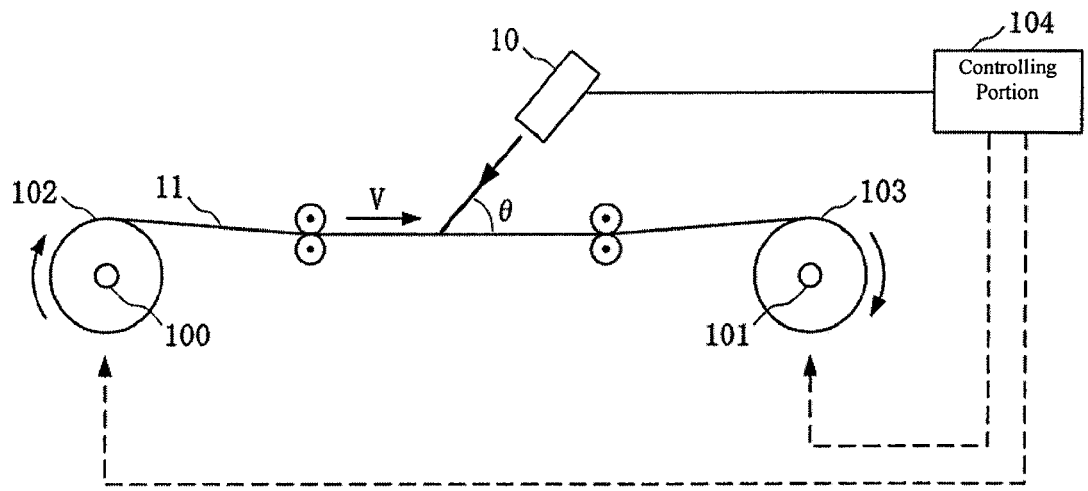
FIG. 2 is a block diagram illustrating the structure of a web conveying device to which is applied the velocity measuring device according to the example.

FIG. 2 is a block diagram illustrating a structure of a web conveying device to which the velocity measuring device according to the example is applied. The web conveying device includes a sending-side guide shaft 100; a receiving-side guide shaft 101; a sending-side roll 102 that is equipped on the sending-side guide shaft 100; a receiving-side roll 103 that is equipped on the receiving-side guide shaft 101; a sending-side motor driving portion (not shown) for driving the sending-side guide shaft 100 to rotate the sending-side roll 102; a receiving-side motor driving portion (not shown) for driving the receiving-side guide shaft 101 to rotate the receiving-side roll 103; and a controlling portion 104 for controlling the sending-side motor driving portion and the receiving-side motor driving portion.

When the sending-side motor driving portion rotates the sending-side roll 102, the web 11 that is wrapped onto the sending-side roll 102 is fed out. On the receiving side, the receiving-side roll 103 takes up the web 11 by the receiving-side motor driving portion rotating the receiving-side roll 103. The controlling portion 104 controls the sending-side motor driving portion and the receiving-side motor driving portion in order to cause the velocity of the web 11 to have a desired value.

The sensor module 10 that has the semiconductor laser 1, the photodiode 2, and the lens 3 is disposed on the web 11 between the sending-side guide shaft 100 and the receiving-side guide shaft 101, as illustrated in FIG. 2, to cause oblique incidence of the laser beam onto the web 11. The oblique incidence of the laser beam is in order to measure the velocity of the web 11. The laser driver 4, the current-voltage converting/amplifying portion 5, the filter portion 6, the signal extracting portion 7, the calculating portion 8, and the displaying portion 9 in FIG. 1 are provided within the controlling portion 104.

The operation of the velocity measuring device according to the present example is explained in detail next. For ease in the explanation, it shall be envisioned below that the semiconductor laser 1 that is used is not of the type that has a mode-hopping phenomenon (the VCSEL type or the DFB laser type).

Figure 3:
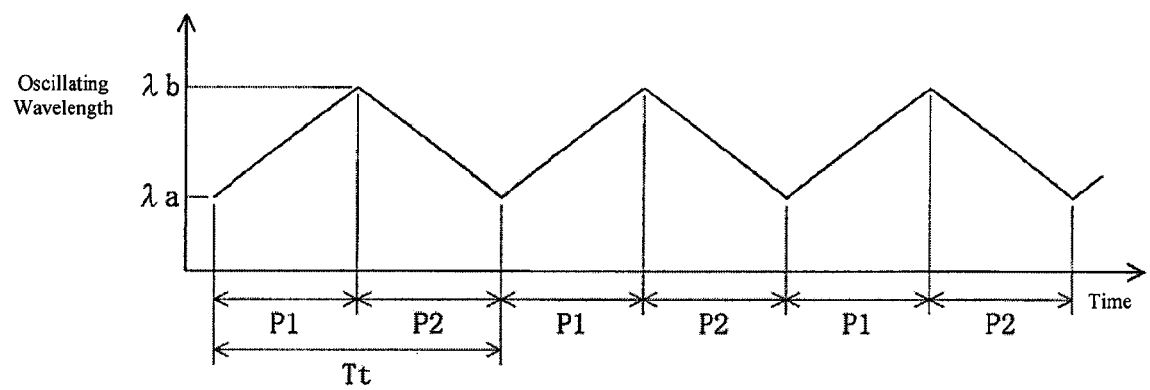
FIG. 3 is a diagram illustrating one example of change over time in the oscillating wavelength of the semiconductor laser in the example.

The laser driver 4 provides, as a driving current to the semiconductor laser 1, a triangle wave driving current that repetitively increases and decreases at a constant rate of change in respect to time. As a result, the semiconductor laser 1 is driven so as to repetitively alternate between a first oscillating interval wherein the oscillating wavelength continuously increases at a constant rate of change, and a second oscillating interval wherein the oscillating wavelength is continuously reduced at a constant rate of change, proportional to the magnitude of the injection current. FIG. 3 is a diagram illustrating the changes in the oscillating wavelength of the semiconductor laser 1 over time. In FIG. 3: P1 is the first oscillating interval; P2 is the second oscillating interval; λa is the minimum value for the oscillating wavelength in each interval; λb is the maximum value for the oscillating wavelength in each interval; and Tt is the period of the triangle wave. In the present form of embodiment, the maximum value λb of the oscillating wavelength and the minimum value λa of the oscillating wavelength are both always constant, so the difference λb−λa thereof is also always a constant.

The beam that is emitted from the semiconductor laser 1 is focused by the lens 3 to be incident on the web 11. A portion of the beam that is reflected from the web 11 is focused by the lens 3 to be incident on the semiconductor laser 1. Note that the focusing by the lens 3 is not absolutely necessary. The photodiode 2 is disposed within or in the vicinity of the semiconductor laser 1, and converts the optical power from the semiconductor laser 1 into an electric current. The current-voltage converting/amplifying portion 5 converts the output current from the photodiode 2 into a voltage, and then amplifies that voltage.

Figure 4:
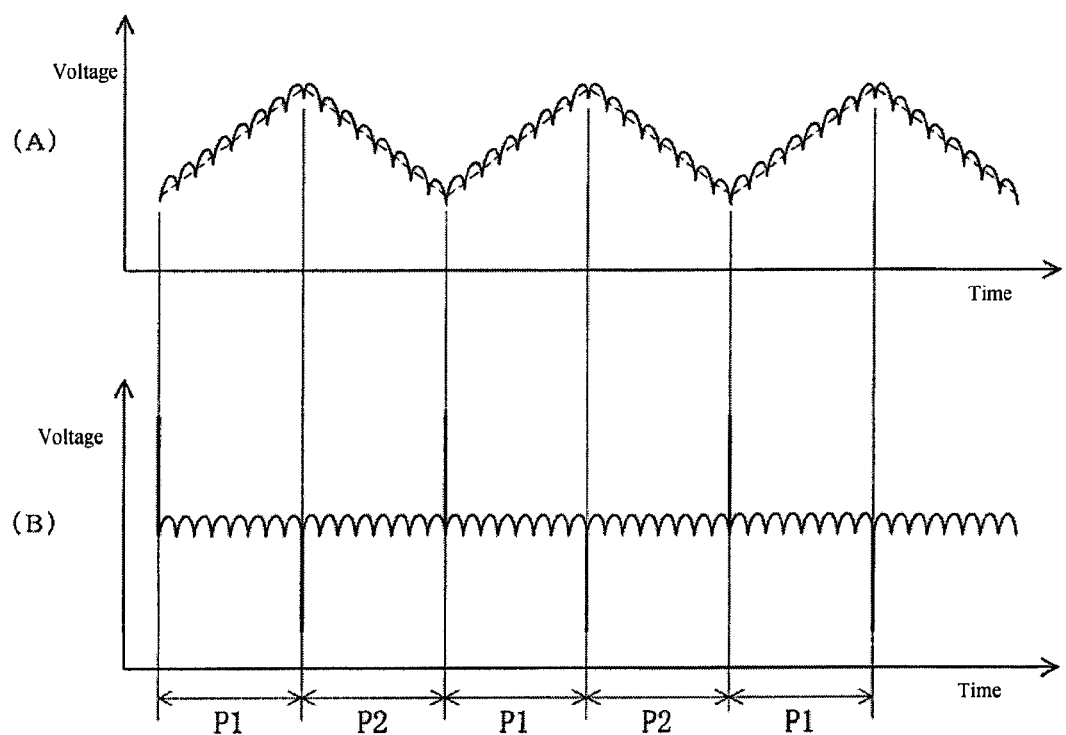
FIG. 4 is a waveform diagram illustrating schematically an output voltage waveform of a current-voltage converting/amplifying portion and an output voltage waveform of a filter portion in the example.

The filter portion 6 has the function of extracting a superimposed signal from a modulated wave. FIG. 4(A) is a diagram illustrating schematically the output voltage waveform of the current-voltage converting/amplifying portion 5, and FIG. 4(B) is a diagram illustrating schematically the output voltage waveform of the filter portion 6. These diagrams illustrate the progression of the waveform (the modulated wave) of FIG. 4(A), which corresponds to the output of the photodiode 2, to the removal of the emitted waveform (the carrier wave) from the semiconductor laser 1 in FIG. 3, to the extraction of the MHP waveform (the interference waveform) of FIG. 4(B).

Following this, the number of MHPs included in the output voltage of the filter portion 6 is counted by the signal extracting portion 7 for the first oscillating interval P1 and for the second oscillating interval P2. The signal extracting portion 7 may use a counter constructed from logic gates, or may count the frequency of the MHPs using a fast Fourier transform (FFT) (that is, may count the number of MHPs per unit time).

Figure 5:
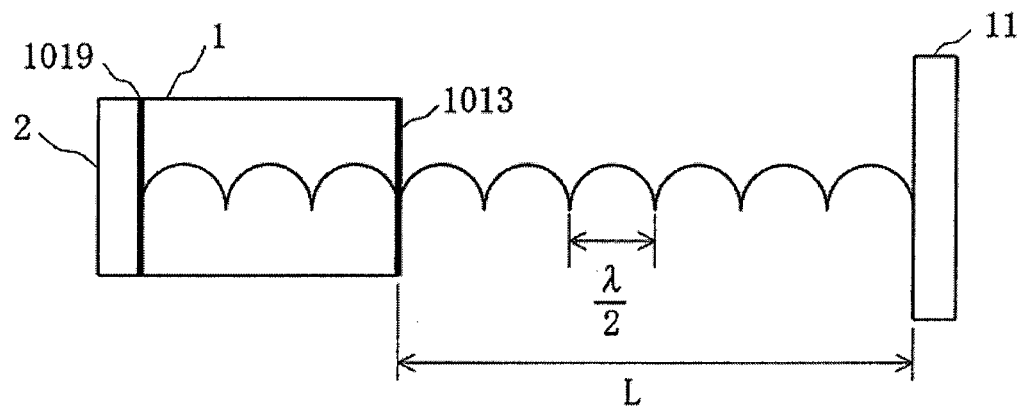
FIG. 5 is a diagram for explaining the mode hop pulse.

Here an explanation is given regarding the MHPs, which are self-coupled signals. As illustrated in FIG. 5, when the distance from a mirror layer 1013 to the web 11 is defined as L and the oscillating wavelength of the laser is defined as λ, and the oscillating conditions set forth below are fulfilled, then there will be a reinforcing interaction between the return beam from the web 11 and the laser beam within the optical resonator of the semiconductor laser 1, to slightly increase the laser power $$L=q\lambda/2 \quad (2)$$

In Equation (2), q is an integer. This phenomenon can be fully observed because an amplifying effect is produced through the increase in apparent reflectance within the oscillator of the semiconductor laser 1, even if the scattered beam from the web 11 is extremely slight. Note that in FIG. 5, 1019 is a dielectric multilayer that serves as a mirror.

Figure 6:
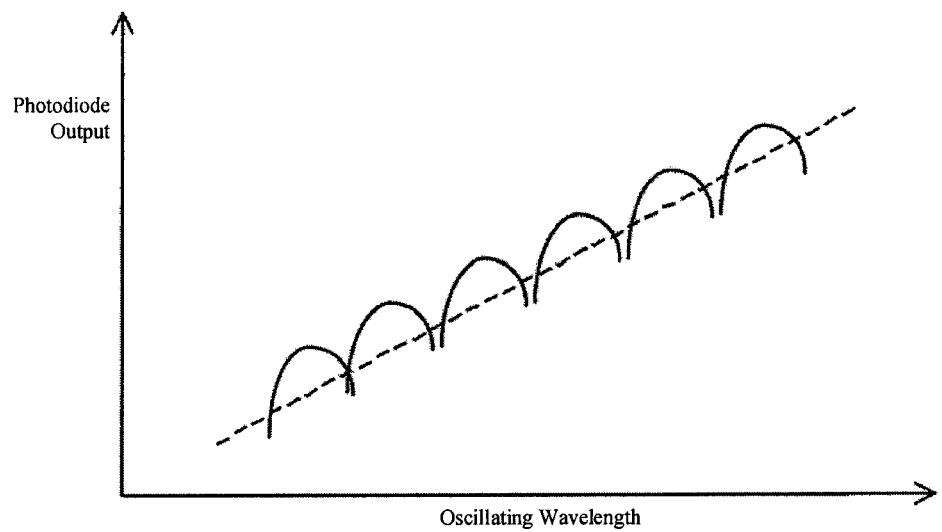
FIG. 6 is a diagram illustrating the relationship between the oscillating wavelength of the semiconductor laser and the output waveform of a photodiode.

FIG. 6 is a diagram illustrating the relationship between the oscillating wavelength and the output waveform of the photodiode 2 when the oscillating wavelength of the semiconductor laser 1 is varied by a uniform ratio. When $L=q\lambda/2$, indicated in Equation (2), is satisfied, then the phase difference between the return beam and the laser beam within the optical resonator will go to 0° (in-phase), so that the return beam and the laser beam within the optical resonator will maximally intensify each other, and when $L=q\lambda/2+\lambda/4$, then the phase difference will be 180° (anti-phase), so the return beam and the laser beam within the optical resonator will maximally weaken each other. Because of this, when the oscillating wavelength of the semiconductor laser 1 is varied, places wherein the laser power is strong and places wherein the laser power is weak will alternatingly appear repetitively, and if the laser power at this time is detected by the photodiode 2, then, as illustrated in FIG. 6, a waveform that has a stair step shape will be produced with a constant period. This type of waveform is commonly known as interference fringes. Each step-shape waveform, that is, each individual interference fringe, is an MHP. As described above, when the oscillating wavelength of the semiconductor laser 1 is varied, the number of MHPs in a constant interval will vary proportionally to the measurement distance. Moreover, when the web 11 has a velocity, there will be an increase in the number of MHPs that is proportional to that velocity, due to the Doppler effect component.

Figure 7:
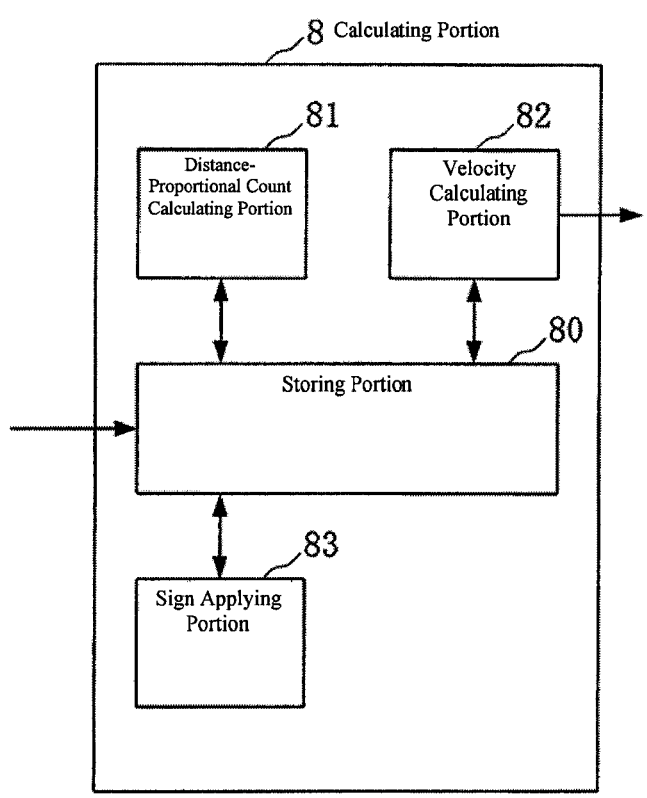
FIG. 7 is a block diagram illustrating one example of a structure of a calculating portion in the example.

The calculating portion 8 then calculates the velocity of the web 11 based on the number of MHPs counted by the signal extracting portion 7. FIG. 7 is a block diagram illustrating one example of a structure for a calculating portion 8. The calculating portion 8 includes a storing portion 80 for storing, for example, the counting results of the signal extracting portion 7; a distance-proportional count calculating portion 81 for calculating the number of MHPs (which shall be termed the "distance-proportional count," below) NL, which is proportional to the average distance between the semiconductor laser 1 and the web 11; and a sign applying portion 83 for applying a positive or negative sign to the most recent counting results by the signal extracting portion 7 depending on, whether or not the directions of increase or decrease of the counting results of the signal extracting portion 7 match.

Figure 8:
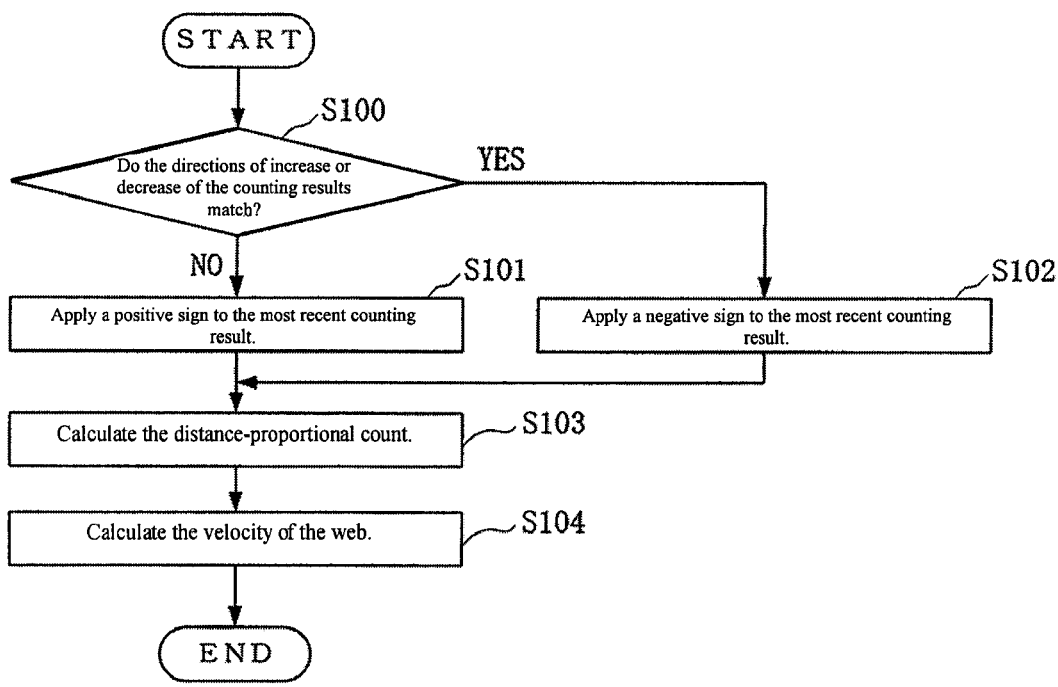
FIG. 8 is a flowchart illustrating the operation of the calculating portion in the example.

FIG. 8 is a flowchart illustrating the operation of the calculating portion 8. The counting result of the signal extracting portion 7 is stored in the storing portion 80 of the calculating portion 8. The sign applying portion 83 of the calculating portion 8 evaluates whether or not the directions of increase or decrease of the counting results for the first oscillating interval P1 and the counting result of the second oscillating interval P2 in the signal extracting portion 7 match (Step S100 in FIG. 8), and assigns either a positive or negative sign to the most recent counting result by the signal extracting portion 7 depending on the result of that evaluation (Step S101 and S102 in FIG. 8).

Figure 9:
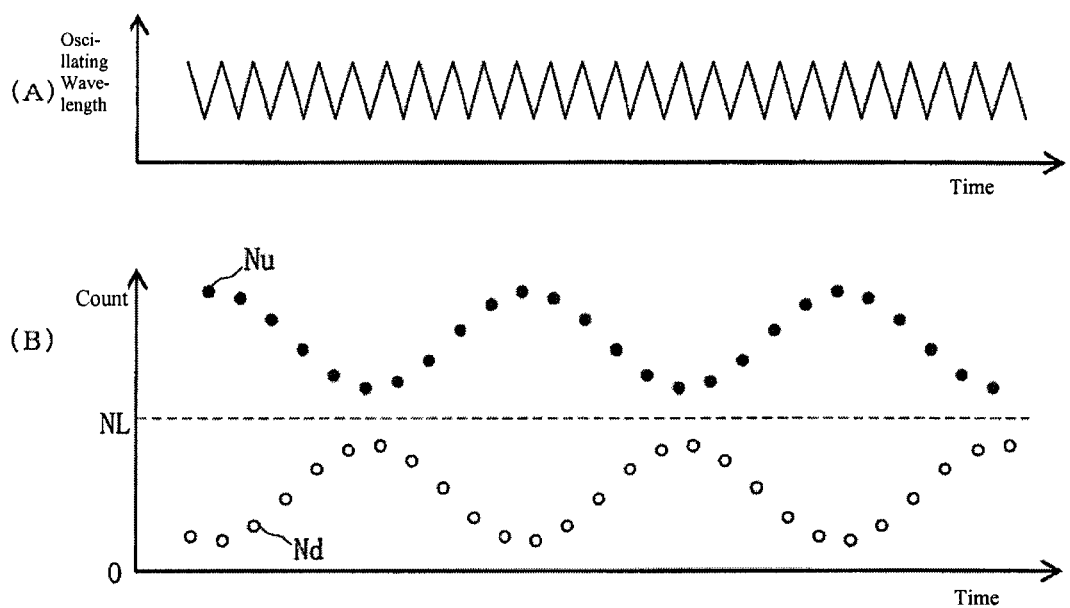
FIG. 9 is a diagram for explaining the operation of the sign applying portion in the example.
Figure 10:
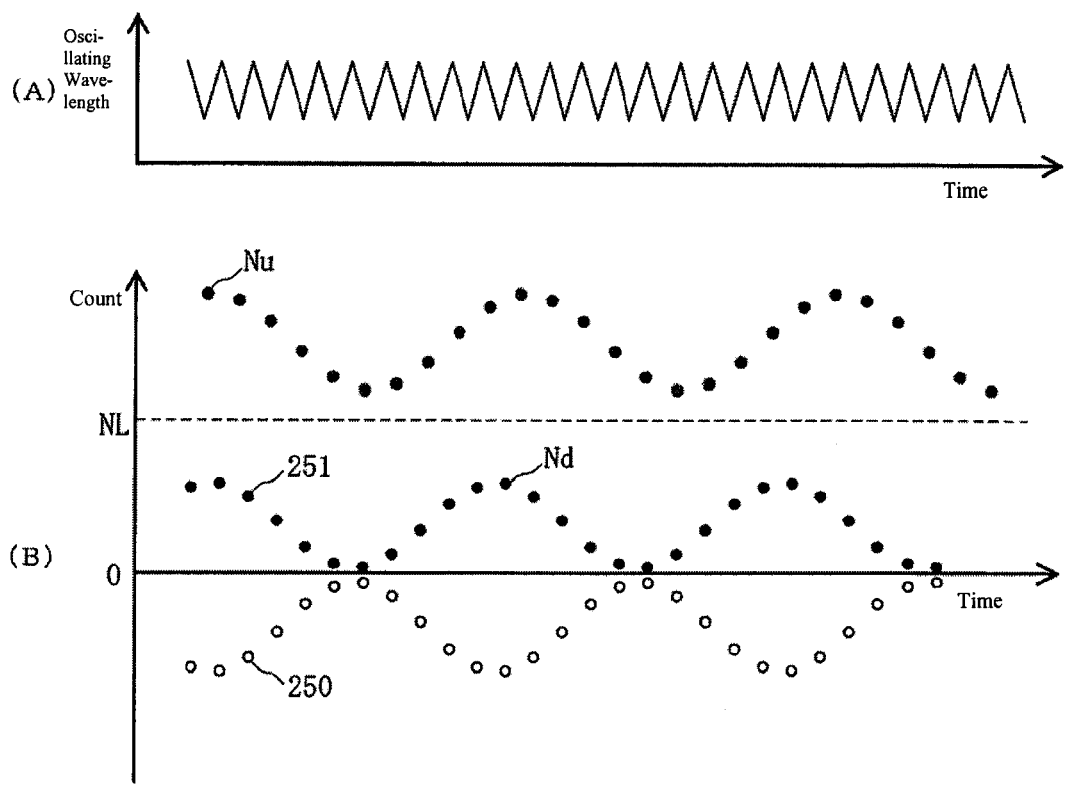
FIG. 10 is a diagram for explaining the operation of the sign applying portion in the example.

FIG. 9(A), FIG. 9(B), FIG. 10(A), and FIG. 10(B) are diagrams for explaining the operation of the sign applying portion 83, where FIG. 9(A) and FIG. 10(A) are diagrams illustrating the change in the oscillating wavelength of the semiconductor laser 1 over time, and FIG. 9(B) and FIG. 10(B) are diagrams illustrating the changes in the counting results of the signal extracting portion 7 over time. In FIG. 9(B) and FIG. 10(B): Nu is the counting result for the first oscillating interval P1, Nd is the counting result for the second oscillating interval P2, and NL is the distance-proportional count. As is clear from FIG. 3, the first oscillating interval P1 and the second oscillating interval P2 are encountered alternatingly, and thus the counting result Nu and the counting result Nd also appear alternatingly. Note that the example in FIG. 9(B) and FIG. 10(B) illustrates the case wherein the counting result Nu is the counting result Na when the direction of the velocity of the wave 11 is opposite the direction of change of the position of the wave fronts, including a specific number of waves between the surface illuminated by the semiconductor laser 1 and the semiconductor laser 1 that is the light source.

When a tension is applied to the web 11, the web 11, in response to the tension, oscillates at a characteristic oscillating frequency. If the rate of change in distance between the semiconductor laser 1 and the web 11 in accordance with this oscillation of the web 11 is smaller than the rate of change of the oscillating wavelength of the semiconductor laser 1, and the web 11 is undergoing simple oscillation in the perpendicular direction, then the change over time in the counting result Nu for the first oscillating interval P1 and the change over time in the counting result Nd in the second oscillating interval P2 will form sine waves with a phase difference of 180° from each other, as illustrated in FIG. 9(B). The state of the web 11 at this time is defined as a state of microdisplacement in Japanese Unexamined Patent Application Publication 2006-313080 ("JP '080").

On the other hand, if the rate of change in the distance between the semiconductor laser 1 and the web 11 is greater than the rate of change of the oscillating wavelength of the semiconductor laser 1, then the change over time in the counting results Nd will be in a form wherein the waveform 250 on the negative side in FIG. 10(B) will double back to the waveform 251 on the positive side. The state of the web 11 in the part wherein this doubling back of the counting result occurs is termed a state of normal displacement in JP '080. On the other hand, the state of the web 11 in the part wherein this doubling back of the counting results does not occur is the aforementioned state of microdisplacement. Note that in JP '369, the state of normal displacement appears when the length of the optical path between the laser and the web is relatively short, the frequency and amplitude of the oscillating wavelength modulation are relatively small, and the movement of the web to be detected is relatively fast.

In the part wherein this doubling back of the counting result occurs, if the counting result were to be used as-is to calculate the distance-proportional count NL, described below, then the distance-proportional count NL would assume a value that is not the actual value. That is, in order to calculate the distance-proportional count NL correctly, it is necessary to evaluate whether the web 11 is in a state of normal displacement or a state of microdisplacement, and if the web 11 is in a state of normal displacement, to make a correction by applying a negative sign to the result of counting that has doubled back to the positive side.

Given this, when, as illustrated in FIG. 9(B), the change over time in the counting result Nd relative to the change over time in the counting result Nu are in opposite directions (NO in Step S100 in FIG. 8), the sign applying portion 83 evaluates that the web 11 is in the state of microdisplacement, and outputs the signed counting value N'(t) wherein a positive sign has been applied to the counting result N(t) of the signal extracting portion 7 at time mark t (Step S101 in FIG. 8). Furthermore, when the change over time in the counting result Nd is in the same direction as the change over time in the counting result Nu, as illustrated in FIG. 10(B) (YES in Step S100 in FIG. 8), then the sign applying portion 83 evaluates that the web 11 is in the state of normal displacement and outputs the signed counting results N'(t) wherein a negative sign has been applied to the counting result N(t) of the signal extracting portion 7 at the time mark t (Step S102 in FIG. 8).

If the counting result at time mark t is Nu, then the increase or decrease in the counting result Nu can be evaluated by the sign of the difference Nu(t)–Nu(t–2) between the counting result Nu(t) at the time mark t and the counting result Nu(t–2), two times earlier, and the increase or decrease in the counting result Nd can be evaluated by the sign of the difference Nd(t–1)–Nd(t–3) between the counting result Nd(t–1) one time earlier and the counting result Nd(t–3) three times earlier. On the other hand, if the counting result at the time mark t is Nd, then the increase or decrease in the counting result Nu can be evaluated by the sign of the difference Nu(t–1)–Nu(t–3) between the counting results Nu(t–1) one time earlier and the counting result Nu(t–3) three times earlier, and the increase or decrease in the counting result Nd can be evaluated by the sign of the difference Nd(t)–Nd(t–2) between the counting result Nd(t) at the time mark t and the counting result Nd(t–2) two times earlier.

It as the result of the evaluation is that both of the counting results Nu and Nd are increasing or both are decreasing, then the change over time in the counting result Nd is in the same direction as the change over time in the counting result Nu, making it possible to determine that the web 11 is in the state of normal displacement. Moreover, if either the counting result Nu or Nd is increasing and the other is decreasing, then the change over time in the counting result Nd is in the opposite direction from the change over time in the counting result Nu, and thus it can be determined that the web 11 is in the state of microdisplacement.

The signed counting result N'(t) is stored in the storing portion 80. The sign applying portion 83 performs the sign applying process, described above, with each time mark at which the number of MHPs is measured by the signal extracting portion 7 (with each oscillating interval).

Figure 11:
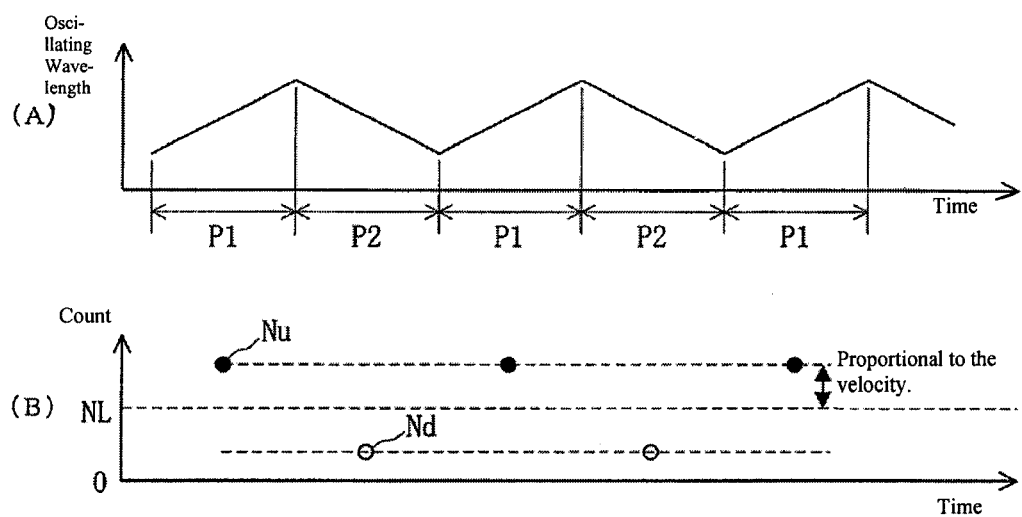
FIG. 11 is a diagram for explaining the operation of the distance-proportional count calculating portion in the example.

The distance-proportional count calculating portion 81 of the calculating portion 8 then calculates the distance-proportional count NL from the signed counting result to which the sign was applied by the sign applying portion 83 (Step S103 in FIG. 8). FIG. 11(A) and FIG. 11(B) are diagrams for explaining the operation of the distance-proportional count calculating portion 81, where FIG. 11(A) is a diagram illustrating the change over time in the oscillating wavelength of the semiconductor laser 1, and FIG. 11(B) is a diagram illustrating the change over time in the counting result by the signal extracting portion 7.

As is clear from FIG. 11(A), the first oscillating interval P1 and the second oscillating interval P2 are encountered alternatingly, and thus the counting result Nu and the counting result Nd also appear alternatingly. The counting results Nu and Nd are either the sum or the difference between the distance-proportional count NL and the number of MHPs (hereinafter termed the displacement-proportional count) NV, which is proportional to the displacement of the web 11. The distance-proportional count NL corresponds to the average value of the counting results Nu and Nd. Furthermore, the difference between the counting result Nu or Nd and the distance-proportional count NL corresponds to the displacement-proportional count NV.

The distance-proportional count calculating portion 81 uses a signed counting result prior to the time mark t, as illustrated in the following equation, to calculate the distance-proportional count NL:

$$NL=(Nu'+Nd')/2 \quad (3)$$

In Equation (3), Nu' is the signed counting result after the execution of the sign applying process to the counting result Nu, and Nd' is the signed counting result after the execution of the sign applying process to the counting result Nd.

Note that at a time of the early period of the beginning of the measurement, it is not possible to obtain an adequate number of counting results Nu and Nd in order to evaluate whether or not the direction of increase or decrease of the counting results Nu and Nd of the signal extracting portion 7 match. Because of this, the sign applying portion 83 cannot output a signed counting result, because it cannot evaluate whether or not the directions of increase or decrease of the counting results Nu and Nd of the signal extracting portion 7 match. Consequently, at the time of the early period of the beginning of the measurement, the distance-proportional count calculating portion 81 calculates the distance-proportional count NL through the following equation that uses the counting results Nu and Nd, rather than through Equation (3):

$$NL=(Nu+Nd)/2 \tag{4}$$

That is, the distance-proportional count calculating portion 81 calculates the distance-proportional count NL using Equation (4) at the time of the early period of the beginning of the measurement, and calculates the distance-proportional count NL using Equation (3) after the signed counting results required for calculating the distance-proportional count NL have been calculated by the sign applying portion 83.

The distance-proportional count NL, calculated by the distance-proportional count calculating portion 81, is stored in the storing portion 80. The distance-proportional count calculating portion 81 performs the process for calculating the distance-proportional count NL, as described above, at each time mark wherein the number of MHPs is measured by the signal extracting portion 7 (that is, with each oscillating interval). Note that while in the present form of embodiment the distance-proportional count NL was calculated using the counting results for two times, instead the distance-proportional count NL may be calculated using counting results for 2m times (where m is a positive integer).

Next the velocity calculating portion 82 of the calculating portion 8 calculates the velocity V of the web 11 from the distance-proportional count NL (Step S104 in FIG. 8). Because the difference between the counting result N (that is, Nu or Nd) of the signal extracting portion 7 and the distance-proportional count NL is proportional to the velocity V of the web 11, it is possible to use the following equation to calculate the displacement D, in the direction of progress of the web 11, at intervals of quarter-periods of the carrier wave (the triangle wave) for the oscillating wavelength modulation of the semiconductor laser 1:

$$V=\lambda/2\times|N-NL|\times\cosine\ \theta \tag{5}$$

In Equation (5): $\lambda$ is the average wavelength of oscillation of the semiconductor laser 1; and $\theta$ is the angle formed by the optical axis of the laser beam from the semiconductor laser 1 relative to the web 11, as illustrated in FIG. 2. If the frequency of the carrier wave is defined as f, then the velocity V of the web 11, by Equation (5), can be calculated through the following equation:

$$V=\lambda\times f\times|N-NL|\times\cosine\ \theta \tag{6}$$

The velocity calculating portion 82 performs the process for calculating the velocity V using Equation (6) at each time mark whereat the number of MHPs is measured by the signal extracting portion 7 (with each oscillating interval). The displaying portion 9 displays the velocity V of the web 11, calculated by the velocity calculating portion 82.

The controlling portion 104 of the web conveying device controls the sending-side Motor driving portion and the receiving-side motor driving portion based on the results of calculation by the velocity calculating portion 82, so that the velocity V of the web 11 will go to a specific number. Note that because this is not a structural element, there is no description of means for calculating the tension of the web 11. However, the tension on the web 11 may be measured through a well-known technology, and, of course, the sending-side motor driving portion and the receiving-side motor driving portion may be controlled so that the tension on the web 11 is a desired value.

As described above, in the present example the provision of the sign applying portion 83 enables the evaluation as to whether the web 11 is in the state of normal displacement or in the state of microdisplacement, and if the web 11 is in the state of normal displacement, then it is possible to make a correction by applying a negative sign to the counting result that has doubled back to the positive side, thus making it possible to calculate the distance-proportional count correctly, which results in the ability to calculate the velocity of the web 11 correctly. Consequently, the example enables the correct calculation of the velocity of the web 11, because it is possible to handle even a case wherein neither the velocity of the web 11 nor the distance between the semiconductor laser 1 and the web 11 is known.

In the example above the positive or negative sign was applied to the most recent counting result by the signal extracting portion 7 depending on whether or not the direction of increase or decrease of the counting results of the signal extracting portion 7 matched; however, instead the positive or negative sign may be applied to the most recent counting result by the signal extracting portion 7 depending on the magnitude relationship between the counting result of the signal extracting portion 7 one time earlier with twice the distance-proportional count NL that is calculated using the counting result prior to that counting result. Because the structure of the velocity measuring device in the present example is identical to that of the above example, the explanation uses the codes in FIG. 1 and FIG. 7.

Figure 12:
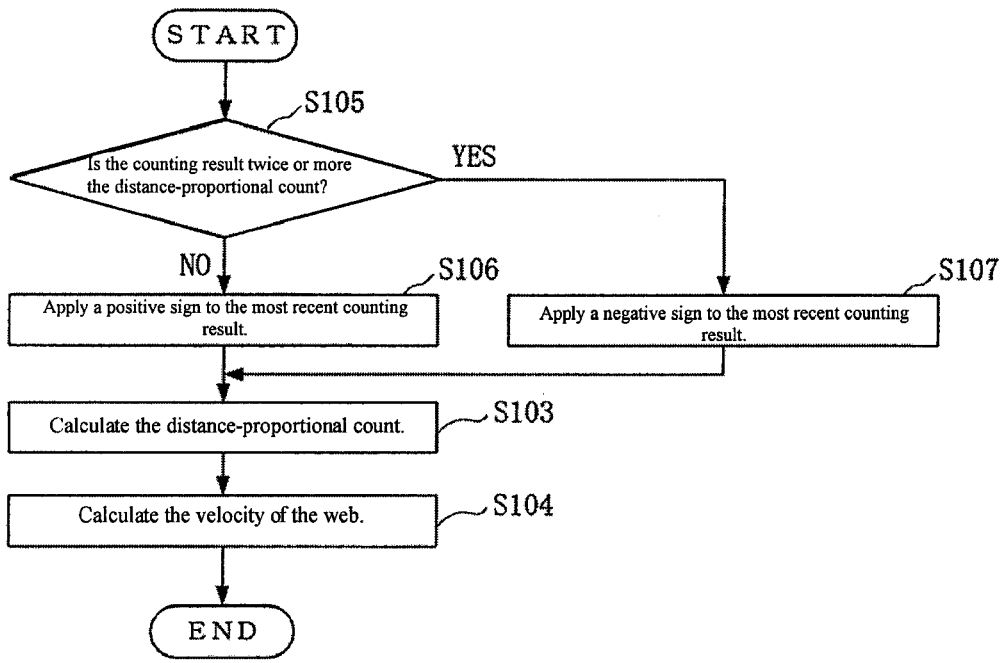
FIG. 12 is a flowchart illustrating the operation of the calculating portion in another example.

FIG. 12 is a flow chart illustrating the operation of the calculating portion 8 in the present example, where the same codes are applied as in FIG. 8 for the processes that are identical to those in the example above. The sign applying portion 83 in the present example evaluates the magnitude relationship between the measurement results N (t−1 measured one time prior to the time mark t), and 2 NL, which is twice the distance-proportional count NL calculated using the counting result prior to the counting result N(t−1) (Step S105 in FIG. 12), and applies a positive or negative sign to the counting result N(t) of the signal extracting portion 7 at time mark t in accordance with this magnitude relationship (FIG. 12 Step S106 and S107).

If the counting results N(t) at time mark t is a counting result Nu of a first oscillating interval P1, then the counting result N(t−1) that is one time earlier will be a counting result Nd of a second oscillating interval P2. Conversely, if the counting result N(t) at the time mark t is a counting result Nd of a second oscillating interval P2, then the counting result N(t−1) from one time earlier will be a counting result Nu of the first oscillating interval P1. The sign applying portion 83 specifically executes the following equations:

$$\text{If } N(t-1) \geqq 2NL, \text{ then } N'(t) \rightarrow -N(t) \tag{7}$$

$$\text{If } N(t-1) < 2NL, \text{ then } N'(t) \rightarrow +N(t) \tag{7A}$$

Equation (7) and Equation (7A) are equations for evaluating whether the web 11 is in the state of normal displacement or in the state of microdisplacement. In the state of normal displacement, wherein doubling back of the counting result occurs, then $N(t-1) \geqq 2$ NL will be satisfied. Consequently, when $N(t-1) \geqq 2$ NL is satisfied, as illustrated in Equation (7) (YES in Step S105 in the FIG. 12), then the sign applying portion 83 will output the signed counting result N'(t) wherein the negative sign has been applied to the counting result N(t) of the signal extracting portion 7 at time mark t (Step S107 in FIG. 12).

On the other hand, if in a state of microdisplacement wherein the doubling back of the counting result does not occur, then N(t−1)<2 NL will be satisfied. Consequently, when N(t−1)<2 NL is satisfied, as illustrated in Equation (7) (NO in Step S105 in FIG. 12), then the sign applying portion 83 will output a signed counting result N'(t) wherein a positive sign has been applied to the counting result N(t) of the signal extracting portion 7 at time mark t (Step S106 in FIG. 12).

The signed counting result N'(t) is stored in the storing portion 80. The sign applying portion 83 performs the sign applying process as set forth above each time the number of MHPs is measured by the signal extracting portion 7 (each oscillating interval). Note that the condition to be satisfied in Equation (7) may be N(t−1)>2 NL, and the condition to be fulfilled in Equation (7A) may be N(t−1)≦2.

As with the above example, at a time of the early period of the beginning of the measurement of the velocity, it is not possible to obtain 2 NL, which is two times the distance-proportional count NL, calculated using the counting result N(t−1) and counting results prior to the counting result N(t−1), and thus it is not possible for the sign applying portion 83 to output a signed counting result due to the inability to evaluate the magnitude relationship. Consequently, the distance-proportional count calculating portion 81, calculates the distance-proportional count NL using Equation (4), and after the signed counting results that are required for calculating the distance-proportional count NL have been calculated by the sign applying portion 83, it then uses Equation (3) to calculate the distance-proportional count NL. The other structures of the velocity measuring device are identical to the structures in the above example. Identical effects as in the above example can be obtained through the present example as well.

A further example is explained next. When doubling back of a counting result occurs, as explained in FIG. 10(B), changes occurs in the average values of the counting results Nu and Nd. Given this, the sign applying portion 83 may apply a positive or negative sign to the most recent counting results of the signal extracting portion 7 in accordance with the change in the average values of the counting results Nu and Nd. The structure of the velocity measuring device is the same as that of the above examples in the present example as well, and thus the explanation will use the codes of FIG. 1 and FIG. 7.

Figure 13:
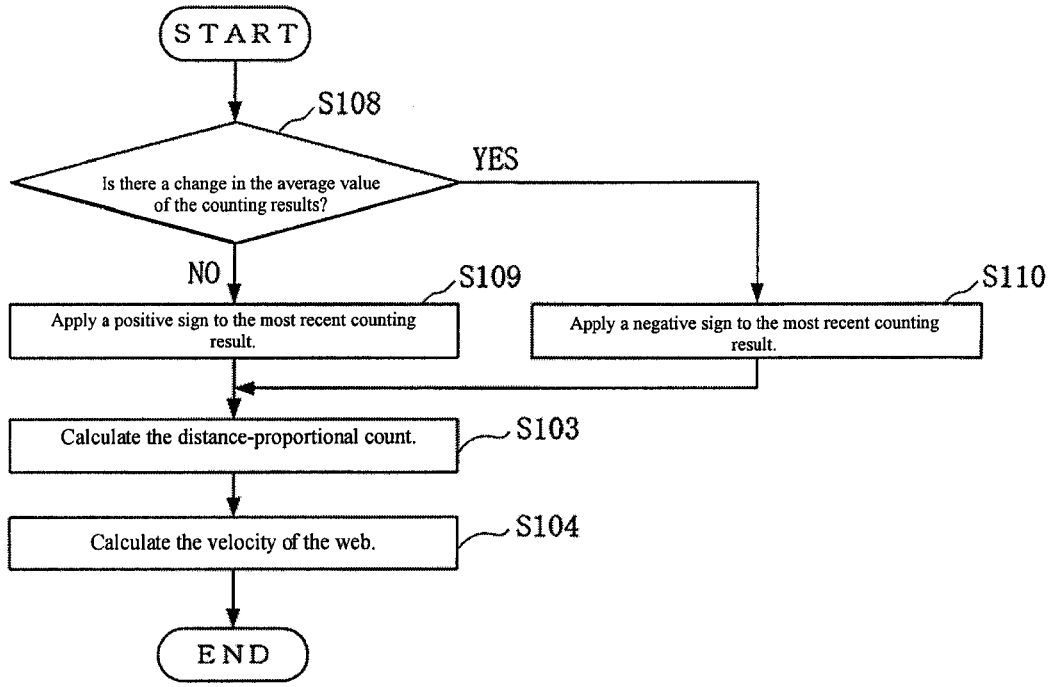
FIG. 13 is a flow chart illustrating the operation of a calculating portion in a further example.

FIG. 13 is a flow chart illustrating the operation of the calculating portion 8 in the example, where the same processes as in the above examples are assigned the same codes as in FIG. 8. The sign applying portion 83 in the present example determines that there has been no change in the respective average values of the counting results Nu and Nd when the most recent average value for the counting result Nu that has been calculated at or before time mark t is within a specific threshold value relative to the average value for the counting result Nu calculated prior to that value, and the most recent average value for the counting result Nd that has been calculated at or before time mark t is within a specific threshold value relative to the average value for the counting result Nd calculated prior to that value (NO in Step S108 in FIG. 13), and outputs the signed counting results N'(t), wherein a positive sign has been applied to the counting result N(t) at the time mark t (Step S109 in FIG. 13).

Additionally, if there has been a change in the most recent average value of the counting result Nu that has been calculated at and before the time mark t in excess of the specific threshold value relative to the average value of the counting results Nu calculated previously or if there has been a change in the most recent average value of the counting result Nd that has been calculated at and before the time mark t in excess of the specific threshold value relative to the average value of the counting results Nd calculated previously (YES in Step S108 in FIG. 13), then the sign applying portion 83 outputs the signed counting results N'(t), wherein a negative sign has been applied to the counting result N(t) at the time mark t (Step S110 in FIG. 13)

The signed counting result N'(t) is stored in the storing portion 80. The sign applying portion 83 performs the sign applying process as set forth above each time the number of MHPs is measured by the signal extracting portion 7 (each oscillating interval).

As with the above examples, at the time of the early period that the beginning of the measurement of the velocity, it is not possible to detect changes in the average values of the counting results Nu and Nd, and thus it is not possible for the sign applying portion 83 to output a signed counting result. Consequently, the distance-proportional count calculating portion 81, at the time of the early period of the beginning of the measurement, calculates the distance-proportional count NL using Equation (4), and after the signed counting results that are required for calculating the distance-proportional count NL have been calculated by the sign applying portion 83, it then uses Equation (3) to calculate the distance-proportional count NL. The other structures of the velocity measuring device are identical to the structures in the above examples. Identical effects as in the above examples can be obtained through the present example as well.

Figure 14:
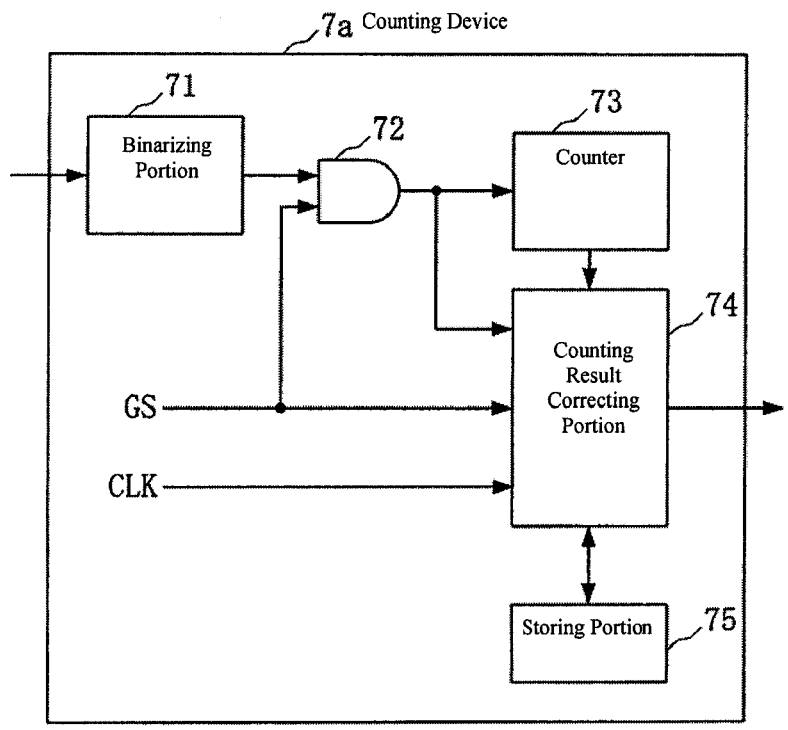
FIG. 14 is a flowchart illustrating an example of a structure of a signal extracting portion.

A further example is explained next. Another example of a structure for the signal extracting portion will be illustrated in the present example. FIG. 14 is a block diagram illustrating one example of a structure for a signal extracting portion 7a according to the present example. The signal extracting portion 7a is structured from: a binarizing portion 71; a logical product calculating portion (AND gate) 72; a counter 73, a counting result correcting portion 74; and a storing portion 75. Interference pattern counting means are structured from the binarizing portion 71, the AND gate 72, and the counter 73.

Figure 15:
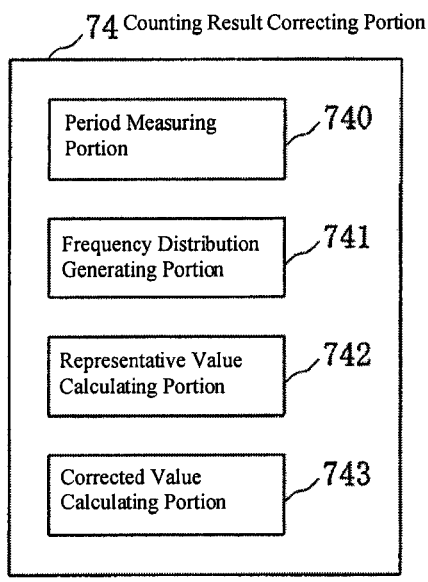
FIG. 15 is a flowchart illustrating the example, of a structure for a counting result correcting portion.

FIG. 15 is a block diagram illustrating one example of a structure for the counting result correcting portion 74. The counting result correcting portion 74 is structured from: a period measuring portion 740; a frequency distribution generating portion 741; a representative value calculating portion 742; and a corrected value calculating portion 743.

Figure 16:
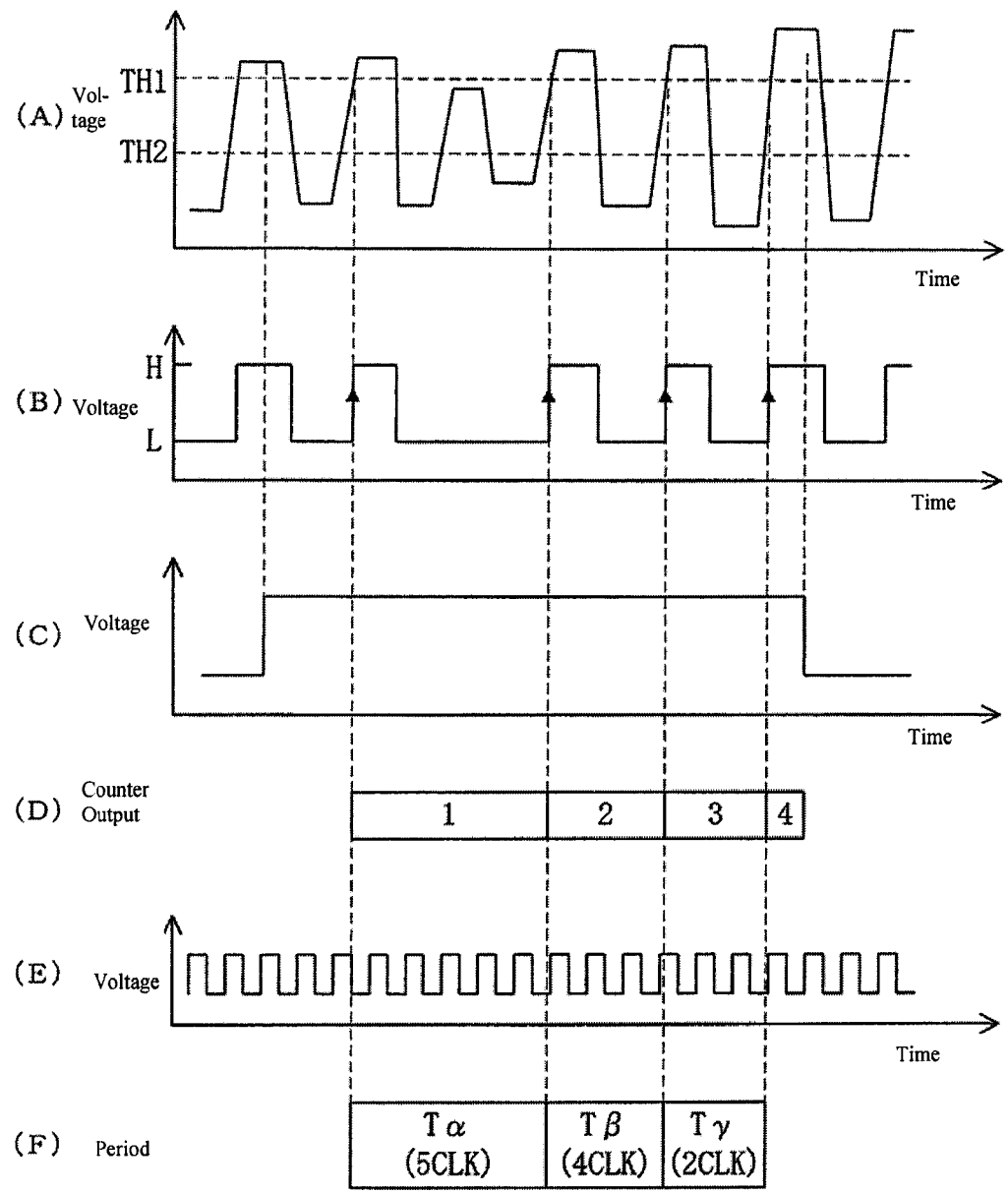
FIG. 16 is a diagram for explaining the operation of the signal extracting portion in the example.

FIG. 16(A) through FIG. 16(F) are diagrams for explaining the operation of the signal extracting portion 7a, wherein: FIG. 16(A) is a diagram illustrating schematically the output voltage from the filter portion 6, or in other words, the MHP waveform; FIG. 16(B) is a diagram illustrating the output of the binarizing portion 71 corresponding to FIG. 16(A); FIG. 16(C) is a diagram illustrating the gate signal GS inputted into the signal extracting portion 7a; FIG. 16(B) is a diagram illustrating the counting results of the counter 73 corresponding to FIG. 16(B); FIG. 16(E) is a diagram illustrating the clock signal CLK inputted into the signal extracting portion 7a; and FIG. 16(F) is a diagram illustrating the measurement results of the period measuring portion 740 corresponding to FIG. 16(B).

First the binarizing portion 71 in the signal extracting portion 7a evaluates whether the output voltage of the filter portion 6 illustrated in FIG. 16(A) is at the high level (H) or at the low level (L), and outputs the evaluation results as illustrated in FIG. 16(B). At this time, the binarizing portion 71 evaluates at the high level when the output voltage from the filter portion 6 rises to be at or above a threshold value TH1, and evaluates at the low level if the output voltage of the filter portion 6 falls to be below a threshold value TH2 (wherein TH2<TH1), to binarize the output of the filter portion 6.

The AND gate 72 outputs the results of logical multiplication operations of the output of the binarizing portion 71 and the gate signal GS, as illustrated in FIG. 16(C), and the counter 73 counts the rising edges of the output of the AND gate 72 (FIG. 16(B)). Here the gate signal GS is a signal that rises at the beginning of the counting interval (which, in the present example, is either the first oscillating interval P1 or the second oscillating interval P2), and falls when the counting interval is over. Consequently, the counter 73 will count the number of rising edges in the outputs of the AND gate 72 during the counting interval (or in other words, the number of rising edges of the MHPs).

On the other hand, the period measuring portion 740 of the counting result correcting portion 74 measures the period of the rising edges of the output of the AND gate 72 during the counting interval (that is, measures the MHP period) each time a rising edge is produced. This time, the period measuring portion 740 measures the period of the MHP in units of the period of the clock signal CLK, illustrated in FIG. 16(E). In the example in FIG. 16(F), the period measuring portion 740 measures periods for the MHP as Tα, Tβ, and Tγ, sequentially. As is clear from FIG. 16(E) and FIG. 16(F), the magnitudes of the periods Tα, Tβ, and Tγ are, respectively, 5 clocks, 4 clocks, and 2 clocks. The frequency of the clock signal CLK is adequately high relative to the maximum frequency that may be assumed by the MHPs. The storing portion 75 stores the counting results of the counter 73 and the measuring results of the period measuring portion 740.

After the gate signal GS falls and the counting interval has been completed, the frequency distribution generating portion 741 of the counting result correcting portion 74 creates a frequency distribution of the periods of the MHPs during the counting interval from the measurement results stored in the storing portion 75. Following this, the representative value calculating portion 742 of the counting result correcting portion 74 calculates, from the frequency distribution generated by the frequency distribution generating portion 741, a representative value T0 for the periods of the MHPs. While there are also methods wherein the value with the highest count or the median value is used as the representative value for the periods for the MHPs, in the case wherein chattering is produced continuously through noise of a frequency higher than the MHP in the vicinity of the threshold for binarization in the signal inputted into the signal extracting portion 7a, the value with the highest frequency and the median value are not suitable as the representative value.

Given this, the representative value calculating portion 742 in the present example defines, as the representative value T0 for the periods of the MHPs, the bin value that has the greatest product of the bin value multiplied by the count thereof. Table 1 illustrates a numerical example of a frequency distribution, and the products of the bin values and the counts thereof in this example of numerical values.

TABLE 1

Example of Numerical Values in a Frequency Distribution

| | Bin Value | | | | | | | | | |
|---|---|---|---|---|---|---|---|---|---|---|
| | 1 | 2 | 3 | 4 | 5 | 6 | 7 | 8 | 9 | 10 |
| Count | 11 | 2 | 0 | 3 | 7 | 10 | 6 | 2 | 3 | 1 |
| Product | 11 | 4 | 0 | 12 | 35 | 60 | 42 | 16 | 27 | 10 |

In the example in Table 1, the value (the bin value) with the highest count, wherein the count was the maximum, is 1. In contrast, the bin value wherein the product of the bin value and the count was a maximum was 6, a value that is different from the value with the highest frequency. The reason for using, for the representative value T0, the bin value wherein the product of the bin value and the frequency is the highest is described below. The representative value calculating portion 742 performs this calculation of the representative value T0 each time the frequency distribution is generated by the frequency distribution generating portion 741.

The corrected value calculating portion 743 of the counting result correcting portion 74 calculates the total Ns of the counts for the bins that are less than 0.5 times the representative value T0 for the interval, and the total Nwn of the counts for the bins that are greater than or equal to (n+0.5) times and less than (n+1.5) times the representative value T0 for the period (where n is a natural number between 1 and N (inclusive)), based on the frequency distribution generated by the frequency distribution generating portion 741, to correct the counting result by the counter 73 as in the following equation:

[Equations 8]

$$Na' = Na - Ns + \sum_{n=1}^{n_{max}} (n \times Nw_n) \qquad (8)$$

$$n_{max} \leq \frac{T_{max}}{T0}$$

Figure 17:
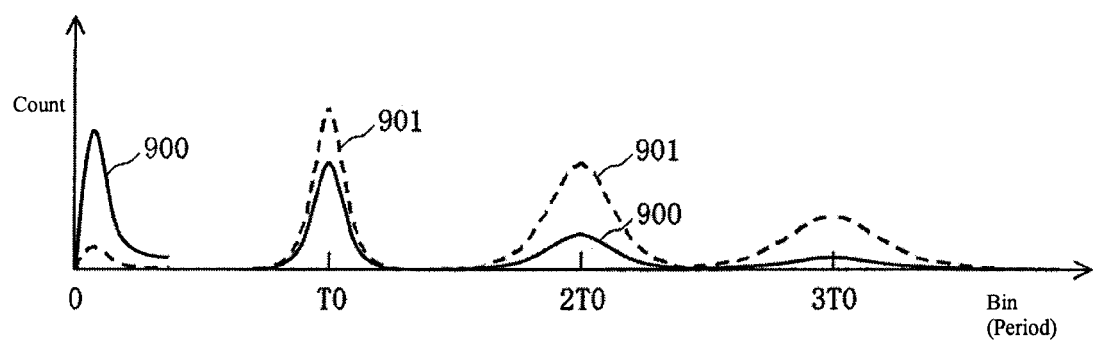
FIG. 17 is a diagram illustrating one example of a mode hop pulse period frequency distribution.

In Equation (8): Na is the number of MHPs, which is the counting result of the counter 73; Na' is the counting result after correction; and Tmax is the maximum value assumed by the period of the MHPs. FIG. 17 illustrates one example of a frequency distribution of the periods for the MHPs. In FIG. 17, 900 is the frequency distribution for the periods of the MHPs, and 901 is the values of the products of the bin values and the counts thereof (the occupation values that indicate the time occupied by the signals of the bin during the counting interval).

Because a high frequency noise is produced continually in the signal inputted into the signal extracting portion 7a in the example in FIG. 17, the highest frequency values for the distribution are in the short periods of less than 0.5 T0. Consequently, if the highest frequency value were to be used as the representative value for the distribution, then the counting results for the MHPs would end up being corrected based on the periods of the noise, which would result in the count correction being in error. Given this, the counting result of the counter 73 is corrected based on the time occupied by the signals in a given bin, or in other words, based on the bin value that has the highest product of the bin value and the count thereof during the counting interval for counting the number of MHPs. This is the reason for using, as the representative value T0, the bin value which has the maximum product of the bin value and the count.

Figure 18:
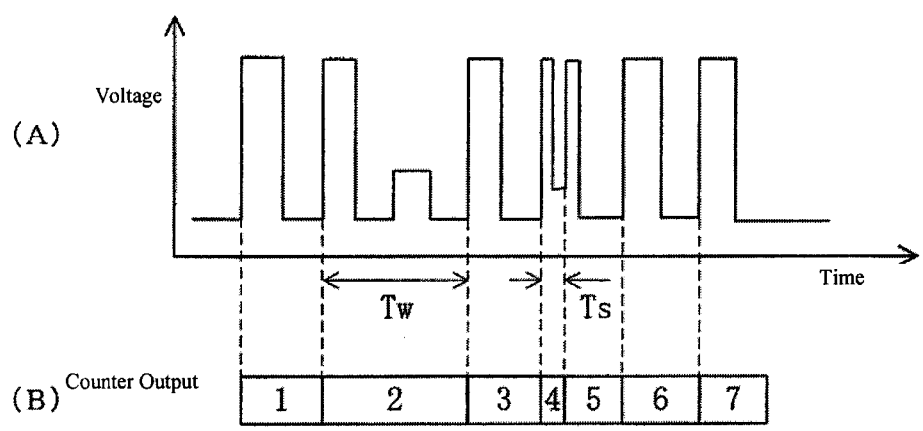
FIG. 18 is a diagram for explaining the principle for correcting the counting results of the counter.

FIG. 18 is a diagram for explaining the principle behind the correction to the counting result of the counter 73, wherein FIG. 18(A) is a diagram illustrating schematically the waveform of the output voltage of the filter portion 6, or in other words, the waveform of the MHPs; and FIG. 18(B) is a diagram illustrating the counting results for the counter 73 corresponding to FIG. 18(A). Because of the noise, there will be missing signals in the MHP waveform, and there can be places wherein waveforms that should not actually be counted as signals are produced, and, as a result, there can also be waveforms missing in the output of the AND gate 72, and waveforms that should not be counted produced in the output of the AND gate 72, resulting in error in the counting results by the counter 73.

When a signal is missing, then the MHP period Tw at the location wherein this missing portion occurred is essentially twice the actual period. In other words, if the period of an MHP is more than about twice that of the representative value T0, then it can be concluded that there was a portion missing in the signal. Given this, the totals Nw of counts of bins with periods of Tw and above are seen as number of times wherein there are missing signals, enabling a correction for the missing signals by adding this Nw to the counting value Na of the counter 73.

Additionally, the period Ts that is the shorter for two MHPs at a location wherein what is actually one MHP is divided into two by noise is a period that is shorter than about 0.5 times the actual period. That is, if the period of an MHP is less than 0.5 times the representative value T0, it can be concluded that the signal has been over-counted. Given this, the total Ns of the counts of the bins that are less than the period Ts can be viewed as the number of times that there has been over-counting, where this Ns may be subtracted from the counting result Na of the counter 73 to correct for the noise that was counted in error.

The above is the principal behind the correction to the counting results, illustrated in FIG. 8. Note that while in the present form of embodiment the Tw did not assume twice the representative value T0, but rather was between no less than (n+0.5) and less than (n+1.5) times the representative value T0, where the reason for this is disclosed in Japanese Unexamined Patent Application Publication 2009-47676. The corrected value calculating portion 743 outputs, to the calculating portion 8, the value of the counting result Na' after the correction that has been calculated by Equation (8). The signal extracting portion 7a, explained in the present example, may be used instead of the signal extracting portion 7 in the above examples. In the present example, the periods of the MHPs during the counting interval are measured, the frequency distribution of the MHPs during the counting interval is generated from the counting results, the bin value having the highest product of the bin value and the count thereof, from the frequency distribution, the total Ns of the counts for the bins that are less than 0.5 times the representative value T0 and the totals Nwn of the counts of the bins that are equal to or greater than (n+0.5) and less than (n+1.5) times the representative value T0 are calculated, and the counting result of the counter 73 is corrected based on these counts Ns and Nwn, enabling the correction, to high accuracy, of the counting error of the MHPs, even when noise is produced continuously at a frequency that is higher than that of the MHPs, in the signal inputted into the signal extracting portion 7, to enable an improvement in the measurement accuracy of the velocity of the web 11.

Figure 19:
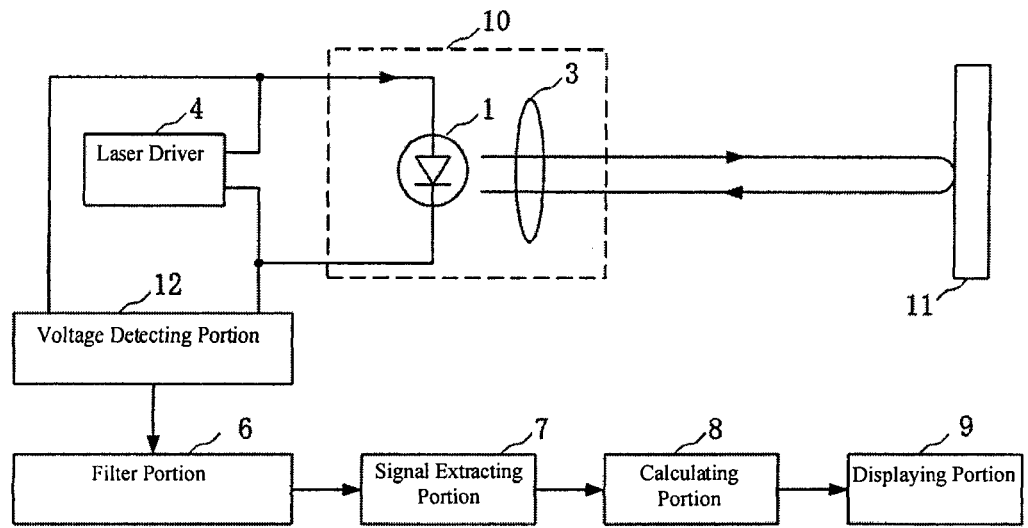
FIG. 19 is a block diagram illustrating a structure for a velocity measuring device according to a yet further example.

Another example is explained next. While in the above examples a photodiode 2 and a current-voltage converting/amplifying portion 5 were used as the detecting means for detecting the electric signal that includes the MHP waveform, it is possible to detect the MHP waveform without using a photodiode. FIG. 19 is a block diagram illustrating the structure of a velocity measuring device according to the present example, and identical codes are assigned to structures that are identical to those in FIG. 1. The velocity measuring device according to the present example uses a voltage detecting portion 12 as the detecting portion, instead of the photodiode 2 and the current-voltage converting/amplifying portion 5 of the above examples.

The voltage detecting portion 12 detects and amplifies the voltage between the terminals of the semiconductor laser 1, or in other words, detects the voltage between the anode and the cathode thereof. When interference occurs between the laser beam that is emitted from the semiconductor laser 1 and the beam that returns from the web 11, MHP waveforms appear in the voltage between the terminals of the semiconductor laser 1. Consequently, it is possible to extract the MHP waveforms from the voltage between the terminals of the semiconductor laser 1.

The filter portion 6 removes the carrier wave from the output voltage of the voltage detecting portion 12. The other structures in the velocity measuring device are identical to those of the above examples. In the present example, the MHP waveforms can be extracted without the use of a photodiode, making it possible to reduce the components in the velocity measuring device relative to the above examples. Moreover, because no photodiode is used in the present example, this makes it possible to exclude the influence of stray scattered light.

In the present example, preferably the driving current provided to the semiconductor laser 1 from the laser driver 4 is controlled to be near to the threshold value current for the laser oscillation. Doing so makes it easy to extract the MHPs from the voltage between the terminals of the semiconductor laser 1.

Note that, in the above examples, at least the signal extracting portions 7 and 7a, the calculating portion 8, and the controlling portion 104 may be achieved through a computer that is provided with a CPU, a storage device, and an interface, and through a program that controls these hardware resources. The program for operating such a computer is provided in a state that is stored on a storage medium such as a floppy disk, a CD-ROM, a DVD-ROM, a memory card, or the like. A CPU writes to a storage device a program that has been read, to thereby achieve the processes described above following the program.

Figure 20:
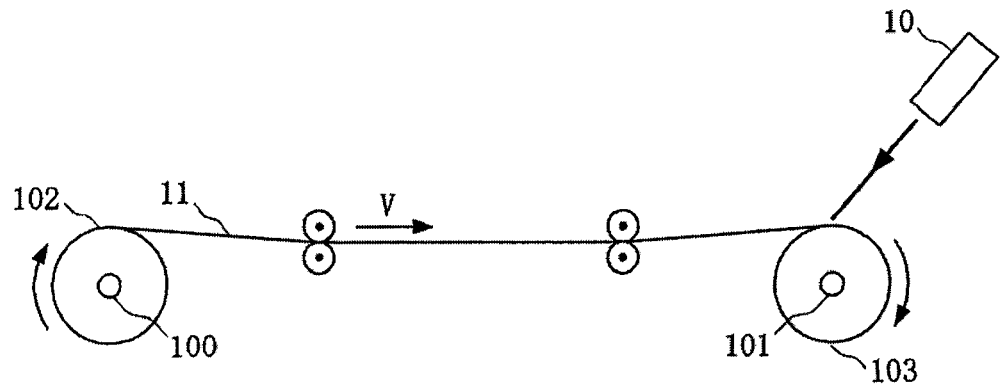
FIG. 20 is a diagram illustrating another example of the layout of a sensor module for a velocity measuring device.
Figure 21:
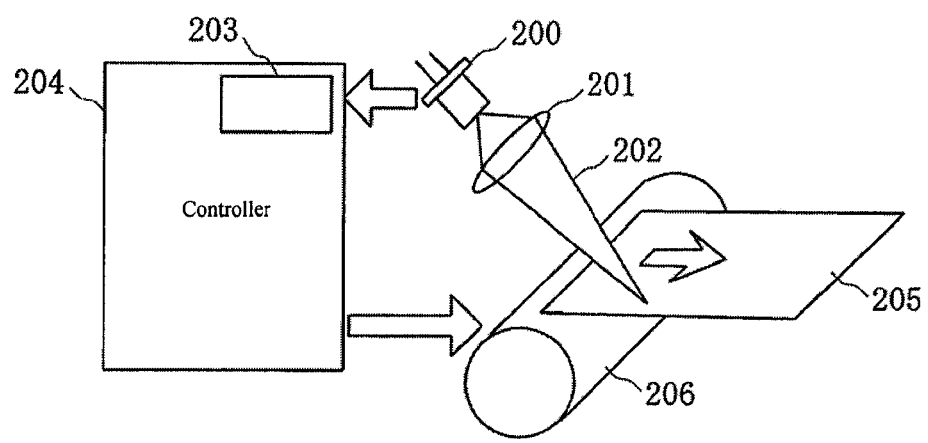
FIG. 21 is a block diagram illustrating the structure of a conventional velocity measuring device.

Additionally, while in the above example a sensor module 10 is disposed as illustrated in FIG. 2, there is no limitation thereto, but rather, as illustrated in FIG. 20, for example, the laser beam from the semiconductor laser 1 may be incident on the web 11 at the location of the sending-side roll 102 or the location of the receiving-side roll 103.

The present invention can be applied to a technology for measuring the velocity of a web that is a physical object that is conveyed by a conveying device from a sending side to a receiving side.

The invention claimed is:

1. A velocity measuring device comprising:
   a semiconductor laser emitting a laser beam at a web that is a physical object that is under conveyance by a conveying device from a sending side to a receiving side;
   an oscillating wavelength modulator causing the semiconductor laser to operate so as to alternatingly be in a first oscillating interval wherein the oscillating wavelength continuously increases monotonically and a second oscillating interval wherein the oscillating wavelength continuously decreases monotonically;
   a detector detecting an electric signal that includes an interference waveform that is produced through a self-coupled effect between a laser beam that is emitted from the semiconductor laser and a return beam from the web;
   a signal extractor counting the number of interference waveforms included in the output signal of the detector during the first emitting interval and the second emitting interval;
   a sign applier applying a positive or negative sign to the most recent counting result by the signal extractor;
   a distance-proportional count calculator calculating a distance-proportional count, which is a number of interference waveforms that is proportional to an average distance between the semiconductor laser and the web, through calculating the average value of the number of interference waveforms, using a signed counting result wherein signs have been applied by the sign applier; and a velocity calculator calculating the velocity of the web from the distance-proportional count calculated by the distance-proportional count calculator; wherein the sign applier apply a positive or negative sign to the most recent counting result of the signal extractor depending on a magnitude relationship with twice the distance-proportional count calculated using the most recent counting result and a counting result prior to that counting result by the signal extractor, depending on whether or not the directions of increase or decrease of the counting results of the signal extractor match or do not match, or depending upon the change in the average value of the counting results.

2. A velocity measuring device as set forth in claim 1, wherein the signal extractor comprises:

an interference waveform counter counting the number of interference waveforms included in the output signal of the detector during the first emitting interval and the second emitting interval;

an interference waveform period measurer measuring the period of the interference waveform each time an interference waveform is inputted during a counting interval wherein the interference waveform counter counts the number of interference waveforms;

an interference waveform period frequency distribution generator generating a frequency distribution of the periods of the interference waveforms during the counting interval, from the measurement results by the interference waveform period measurer;

a representative value calculator calculating, as a representative value for the distribution of the periods of the interference waveforms, a bin value wherein the product of the bin value and the count thereof is a maximum, from the frequency distribution of the periods of the interference waveforms; and a corrected value calculator calculating from the frequency distribution of the periods of the interference waveform a total Ns of the counts of the bins that are less than 0.5 times the representative value and a total Nwn of the counts of the bins that are no less than (n+0.5) times the representative value and less than (n+1.5) times the representative value (where n is a natural number that is no less than 1), to correct the counting result by the interference waveform counting means based on counts Ns and Nwn, and to output the counting result after the correction.

3. A velocity measuring device as set forth in claim 2, wherein the corrected value calculator calculate a counting result Na' of the interference waveform, after correction, using:

[Equation 1]

$$Na' = Na - Ns + \sum_{n=1}^{n_{max}} (n \times Nw_n)$$

$$n_{max} \leq \frac{T_{max}}{T0}$$

wherein the counting result by the interference waveform counter is defined as Na, the representative value is defined as T0, and the maximum value assumed by the interference waveform period is defined as Tmax.

4. A velocity measuring method, comprising the steps of:

an oscillating step causing the semiconductor laser, which emits a laser beam at a web that is a physical object that is in conveyance by a conveying device from a sending side to a receiving side, to operate so as to alternatingly be in a first oscillating interval wherein the oscillating wavelength continuously increases monotonically and a second oscillating interval wherein the oscillating wavelength continuously decreases monotonically;

a detecting step detecting an electric signal that includes an interference waveform that is produced through a self-coupled effect between a laser beam that is emitted from the semiconductor laser and a return beam from the web;

a signal extracting step counting the number of interference waveforms included in the output signal received in the detecting step during the first emitting interval and the second emitting interval;

a sign applying step applying a positive or negative sign to the most recent counting result by the signal extracting step;

a distance-proportional count calculating step calculating a distance-proportional count, which is a number of interference waveforms that is proportional to an average distance between the semiconductor laser and the web, through calculating the average value of the number of interference waveforms, using a signed counting result wherein signs have been applied by the sign applying step; and a velocity calculating step calculating the velocity of the web from the distance-proportional count calculated by the distance-proportional count calculating step;

wherein the sign applying step applies a positive or negative sign to the most recent counting result of the signal extracting step depending on a magnitude relationship with twice the distance-proportional count calculated using the most recent counting result and a counting result prior to that counting result by the signal extracting step, depending on whether or not the directions of increase or decrease of the counting results of the signal extracting step match or do not match, or depending upon the change in the average value of the counting results.

5. A velocity measuring method as set forth in claim 4, wherein the signal extracting method comprises the steps of:

an interference waveform counting step counting the number of interference waveforms included in the output signal received in the detecting step during the first emitting interval and the second emitting interval;

an interference waveform period measuring step measuring the period of the interference waveform each time an interference waveform is inputted during a counting interval wherein the interference waveform counting step counts the number of interference waveforms;

the interference waveform period frequency distribution generating step generating a frequency distribution of the periods of the interference waveforms during the counting interval, from the measurement results by the interference waveform period measuring step;

a representative value calculating step calculating, as a representative value for the distribution of the periods of the interference waveforms, a bin value wherein the product of the bin value and the count thereof is a maximum, from the frequency distribution of the periods of the interference waveforms; and a corrected value calculating step calculating from the frequency distribution of the periods of the interference waveform a total Ns of the counts of the bins that are less than 0.5 times the representative value and a total Nwn of the counts of the bins that are no less than (n+0.5) times the representative value and less than (n+1.5) times the representative value (where n is a natural number that is no less than 1), to correct the counting result by the interference waveform counting step based on counts Ns and Nwn, and to output the counting result after the correction.

6. A velocity measuring method as set forth in claim 5, wherein the corrected value calculating step calculates a counting result Na' of the interference waveform, after correction, using:

[Equation 2]

$$Na' = Na - Ns + \sum_{n=1}^{n_{max}} (n \times Nw_n)$$

$$n_{max} \leq \frac{T_{max}}{T0}$$

when the counting result by the interference waveform counting step is defined as Na, the representative value is defined as T0, and the maximum value assumed by the interference waveform period is defined as Tmax.

\* \* \* \* \*